United States Patent
Pridie

(10) Patent No.: US 10,016,949 B2
(45) Date of Patent: Jul. 10, 2018

(54) METHOD OF MOULDING A CHARGE

(75) Inventor: Jago Pridie, Bristol (GB)

(73) Assignee: Airbus Operations Limited, Bristol (GB)

( * ) Notice: Subject to any disclaimer, the term of this patent is extended or adjusted under 35 U.S.C. 154(b) by 1674 days.

(21) Appl. No.: 12/733,443

(22) PCT Filed: Sep. 29, 2008

(86) PCT No.: PCT/GB2008/050882
§ 371 (c)(1),
(2), (4) Date: Mar. 2, 2010

(87) PCT Pub. No.: WO2009/044194
PCT Pub. Date: Apr. 9, 2009

(65) Prior Publication Data
US 2010/0310818 A1    Dec. 9, 2010

(30) Foreign Application Priority Data

Oct. 4, 2007 (GB) .................................. 0719269.3

(51) Int. Cl.
*B29C 70/44* (2006.01)
*B29C 43/36* (2006.01)
*B29C 70/54* (2006.01)

(52) U.S. Cl.
CPC .......... *B29C 70/44* (2013.01); *B29C 43/3642* (2013.01); *B29C 70/542* (2013.01);
(Continued)

(58) Field of Classification Search
CPC ..... B29C 43/10; B29C 43/12; B29C 43/3642; B29C 43/56; B29C 70/44; B29C 70/542
(Continued)

(56) References Cited

U.S. PATENT DOCUMENTS 3,658,974 A * 4/1972 Scholl .......................... 264/571
4,351,869 A   9/1982 Cresap
(Continued)

FOREIGN PATENT DOCUMENTS

EP    0 405 261    1/1991
EP    0 410 599    1/1991
(Continued)

OTHER PUBLICATIONS

Croall et al, The Mechanical Stability of Polyimide Films at High pH, Oct. 1990, NASA Technical Memorandum 102726, pp. 1-43.*
(Continued)

*Primary Examiner* — Timothy Kennedy
(74) *Attorney, Agent, or Firm* — Nixon & Vanderhye P.C.

(57) ABSTRACT

A method of molding a charge (12) during the manufacture of a composite part. The method comprises: placing the charge and a diaphragm (4) on a male tool, the charge having a first part (12a) which is positioned above a top of the male tool (2) and a second part (12b, 12c) which projects to one side of the maletool; and progressively deforming the second part of the charge against a side of the male tool by applying a pressure difference across the diaphragm and stretching the diaphragm over the male tool as the pressure difference is applied. The diaphragm has a tensile modulus in the plane of the diaphragm which is greater than 5 MPa. Optionally a support membrane may be positioned on a opposite sides of the charge. In the case where a support membrane is used, then the diaphragm has a stiffness in the planeof the diaphragm which is higher than the stiffness of the support membrane in the plane of the support membrane.

20 Claims, 7 Drawing Sheets

(52) U.S. Cl.
CPC ..... *B29C 2043/3644* (2013.01); *Y02T 50/433* (2013.01); *Y10T 428/24132* (2015.01)

(58) Field of Classification Search
USPC ....... 264/313, 314, 315, 316, 547, 548, 549; 156/212; 3/313, 314, 315, 316, 547, 548, 3/549
See application file for complete search history.

(56) References Cited

U.S. PATENT DOCUMENTS

| | | | |
|---|---|---|---|
| 4,946,640 A * | 8/1990 | Nathoo | 264/316 |
| 5,037,599 A | 8/1991 | Olson | |
| 5,123,985 A | 6/1992 | Evans et al. | |
| 5,464,337 A * | 11/1995 | Bernardon | B29C 33/302 264/257 |
| 5,648,109 A * | 7/1997 | Gutowski et al. | 264/314 |
| 5,954,898 A | 9/1999 | McKague et al. | |
| 6,017,484 A | 1/2000 | Hale | |
| 6,478,926 B1 | 11/2002 | Brachos et al. | |
| 6,484,776 B1 | 11/2002 | Meilunas et al. | |
| 2003/0057582 A1 | 3/2003 | Bernardon et al. | |
| 2003/0146543 A1* | 8/2003 | Lebrun | B29C 51/262 264/313 |
| 2004/0130072 A1 | 7/2004 | Sekido et al. | |
| 2005/0086916 A1 | 4/2005 | Caron | |
| 2005/0102814 A1* | 5/2005 | Anderson et al. | 29/455.1 |
| 2005/0183818 A1 | 8/2005 | Zenkner et al. | |
| 2006/0038320 A1* | 2/2006 | Straub et al. | 264/265 |
| 2006/0249883 A1 | 11/2006 | Oguma et al. | |

FOREIGN PATENT DOCUMENTS

| | | |
|---|---|---|
| FR | 2 689 809 | 10/1993 |
| GB | 925339 | 5/1963 |
| GB | 470 498 | 4/1977 |
| JP | 2003-48223 | 2/2003 |
| JP | 2007-118598 | 5/2007 |

OTHER PUBLICATIONS

Wickson et al, Handbook of Vinyl Formulating, 2nd Ed, Chapter 1, Formulation Development, pp. 1-12, 2008.*
International Search Report for PCT/GB2008/050882, dated Oct. 7, 2009.
Written Opinion of the International Searching Authority for PCT/GB2008/050882, dated Oct. 7, 2009.
UK Search Report for GB 0719269.3, dated Jan. 23, 2008.
"Vakuumfolien Wrightlon®, 7400" [Online], (Jan. 13, 2009), 3 pages.
Adams, D. et al., "Optimization and Blending of Composite Laminates Using Genetic Algorithms with Migration", Mechanics of Advanced Materials and Structure, 10, (2003), pp. 183-203.
Russian Office Action and English translation dated Aug. 6, 2012 in RU 2010116114/05.

* cited by examiner

METHOD OF MOULDING A CHARGE

This application is the U.S. national phase of International Application No. PCT/GB2008/050882 filed 29 Sep. 2008, which designated the U.S. and claims priority to GB Application No. 0719269.3 filed 4 Oct. 2007, the entire contents of each of which are hereby incorporated by reference.

FIELD OF THE INVENTION

The present invention relates to a method of moulding a charge during the manufacture of a composite part.

BACKGROUND OF THE INVENTION

It is well known that composite parts reduce in thickness during cure. This process is known as "debulking", and is almost entirely due to the release of entrapped air. Typically the reduction in thickness of a pre-impregnated laminate (commonly known as a "prepreg") is of the order of 10-15%, and for a dry fabric composite the reduction can be even greater. This can become a significant problem when either:
  a) the part is of a significant thickness (typically>10 mm) and is at least partly non-planar; or
  b) the part incorporates padup areas a lot thicker than that of the surrounding material.

A method of moulding articles from layers of composite material is described in US 2002/0012591 A1. A membrane is stretched over a moulding tool whilst a partial vacuum is established between the tool and the membrane. The membrane is made of elastomeric material such as silicon rubber. The stretched membrane acts to consolidate the layers, and remove air.

SUMMARY OF THE INVENTION

A first aspect of the invention provides a method of moulding a charge during the manufacture of a composite part, the method comprising:
  placing the charge and a diaphragm on a male tool, the charge having a first part which is positioned above a top of the male tool and a second part which projects to one side of the male tool; and
  progressively deforming the second part of the charge against a side of the male tool by applying a pressure difference across the diaphragm and stretching the diaphragm over the male tool as the pressure difference is applied,
wherein the diaphragm has a tensile modulus in the plane of the diaphragm which is greater than 5 MPa.

Preferably the diaphragm has a tensile modulus in the plane of the diaphragm which is greater than 5 MPa at 100%, 200% and/or 300% elongation.

The diaphragm may have a tensile modulus in the plane of the diaphragm which is greater than 6, 7 or 8 MPa. Preferably, the tensile modulus is greater than 6, 7 or 8 MPa at 100%, 200% and/or 300% elongation.

A second aspect of the invention provides a method of moulding a charge during the manufacture of a composite part, the method comprising:
  placing the charge, a support membrane, and a diaphragm on a male tool, the support membrane and diaphragm being positioned on opposite sides of the charge, the charge having a first part which is positioned above a top of the male tool and a second part which projects to one side of the male tool;
  supporting the weight of the second part of the charge with the support membrane; and
  progressively deforming the support membrane and the second part of the charge against a side of the male tool by applying a pressure difference across the diaphragm and stretching the diaphragm over the male tool as the pressure difference is applied,
wherein the diaphragm has a stiffness in the plane of the diaphragm which is higher than the stiffness of the support membrane in the plane of the support membrane.

It has been found that by making the diaphragm relatively stiff in the plane of the diaphragm, then the pressure is concentrated in any high curvature regions of the male tool, which is desirable from a debulking perspective. Also, it has been found that a superior forming result, with fewer wrinkles, is obtained by using such a relatively stiff diaphragm.

The first aspect of the invention defines the stiffness of the diaphragm in absolute terms, as an intensive property of the material (also called a bulk property)—namely the tensile modulus. The second aspect of the invention defines the stiffness of the diaphragm in relative terms, as an extensive property of the material—that is the stiffness k as defined by:

$$k = \frac{P}{\delta}$$

where $\delta$ is the distance deflected under an applied tensile force P.

The diaphragm may comprise a multi-layer diaphragm or a single-layer diaphragm. In the multi-layer case one of the layers may have a relatively high tensile modulus, and the others may have a relatively low tensile modulus. Preferably at least one of the diaphragm layers is stiff—that is with a tensile modulus in the plane of the diaphragm which is greater than 5, 6, 7 or 8 MPa. Alternatively the sum of the tensile moduli of the diaphragm layers may be greater than 5, 6, 7 or 8 MPa.

Typically the method further comprises removing the deformed charge from the male tool; and curing it on a female tool.

Typically the top of the male tool meets the side of the male tool at a convex corner with a relatively high curvature—that is, with a curvature greater than the top or side of the male tool.

Typically the charge comprises a composite material, which may be in the form of a stack of plies. For instance the charge may comprise a prepreg material made from resin reinforced with either uniaxial carbon fibre (each ply containing a set of fibres which are substantially aligned with each other) or woven carbon fibre. However in alternative embodiments the charge may be in a non-composite form which is impregnated with matrix to form the composite part during or after the forming step. For example the charge may comprise a non-crimped fabric comprising multi-axial dry fibres which has a binder applied to its surface before forming to enable the manufacture of a debulked dry fibre preform. This dry fibre preform will then be vacuum infused or injected with a liquid resin using techniques such as RIFT (vacuum infusion) or RTM (injection) to create a composite part. The infusion/injection step may be performed on the curing tool as the charge is brought up to cure temperature, or in a separate heating/cooling cycle. Alternatively, non-bindered dry fibre plies may be interleaved with layers of resin film to form a resin film infused (RFI) laminate. When the charge is heated during forming, the resin films flow and impregnate the fibre layers. This type of material is preferred in some applications because it is quicker to lay (typically 0.75 mm per ply compared with 02 mm per ply in a prepreg). Although the mechanical properties of RFI composite parts suffer reduced mechanical performance when compared with prepreg, they have improved mechanical properties when compared to liquid resin technologies such as RTM. Bulk factors are typically higher than in prepregs.

In the preferred embodiments described below, the charge is used to form a spar of an aircraft wing. However the invention may be used to form a variety of other aircraft parts (such as stringers), or parts of other composite structures for (for example) boats, automobiles etc.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
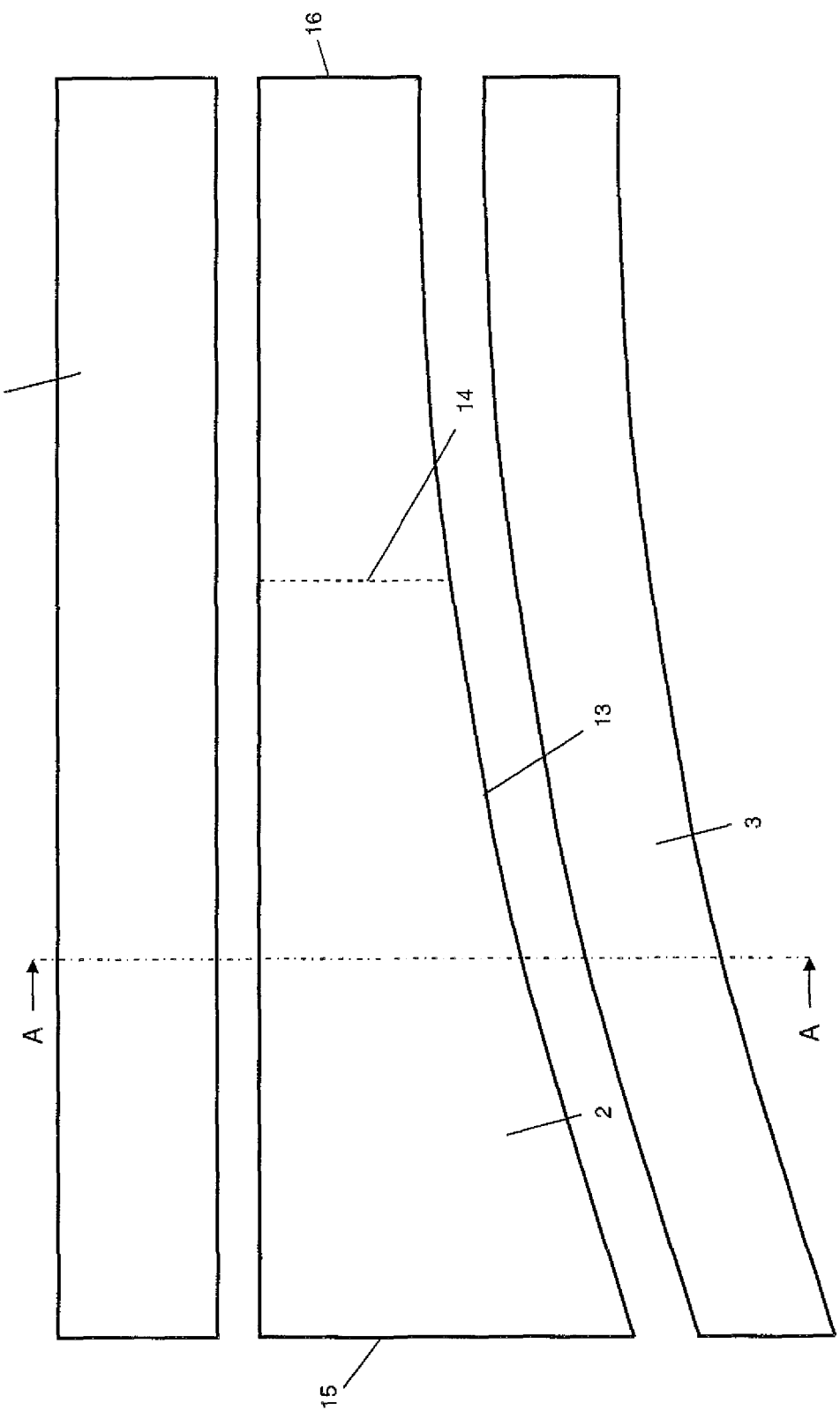
FIG. 1 is a plan view of a male tool and a pair of edge bars.
Figure 2:
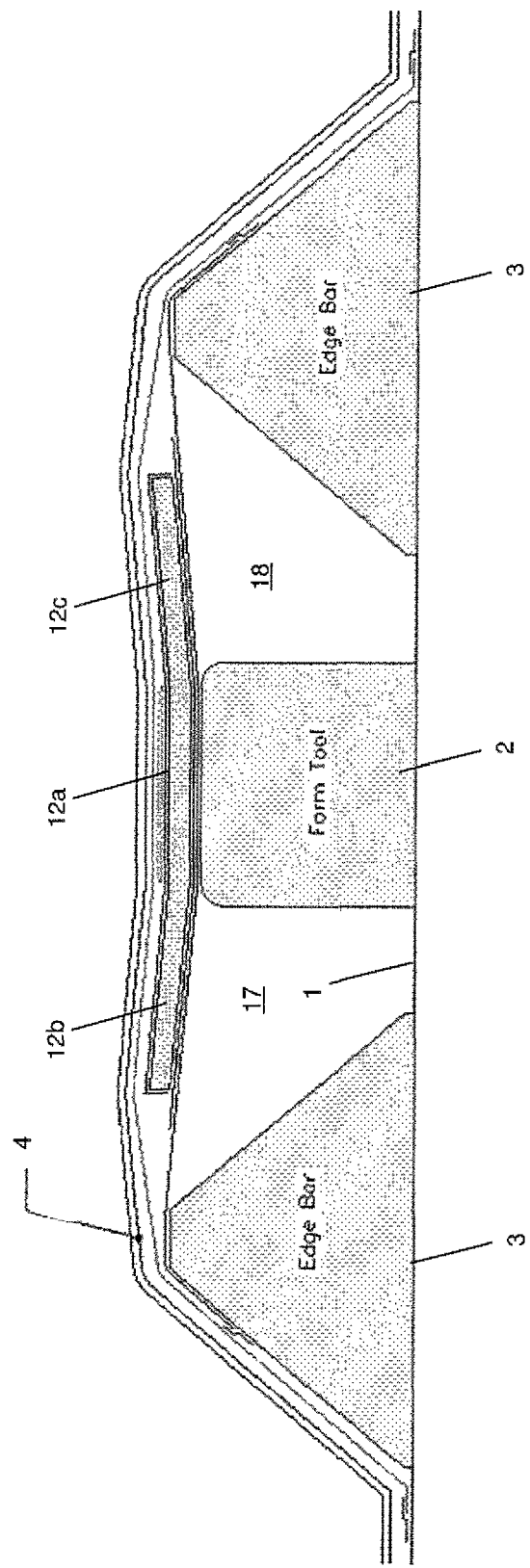
FIG. 2 is a sectional view taken along line A-A in FIG. 1.

FIG. 1 is a plan view of a male moulding and debulking tool 2 and a pair of edge bars 3 which are used to form a C-section aircraft spar. FIG. 2 is a sectional view taken along line A-A in FIG. 1. As shown in FIG. 2, the tool 2 and edge bars 3 are mounted on a table 1.

In a first step, a planar sheet of composite prepreg is formed either by a tape-laying or other automated machine on a planar table (not shown). A planar prepreg charge 12 with the desired shape is then cut from the planar sheet. It will be appreciated that the prepreg charge 12 may be formed from a variety of suitable composite materials. In a preferred embodiment the charge is formed from an epoxy resin reinforced by uniaxial carbon fibres, such as T700/M21 provided by Hexcel (www.hexcel.com).

Figure 3:
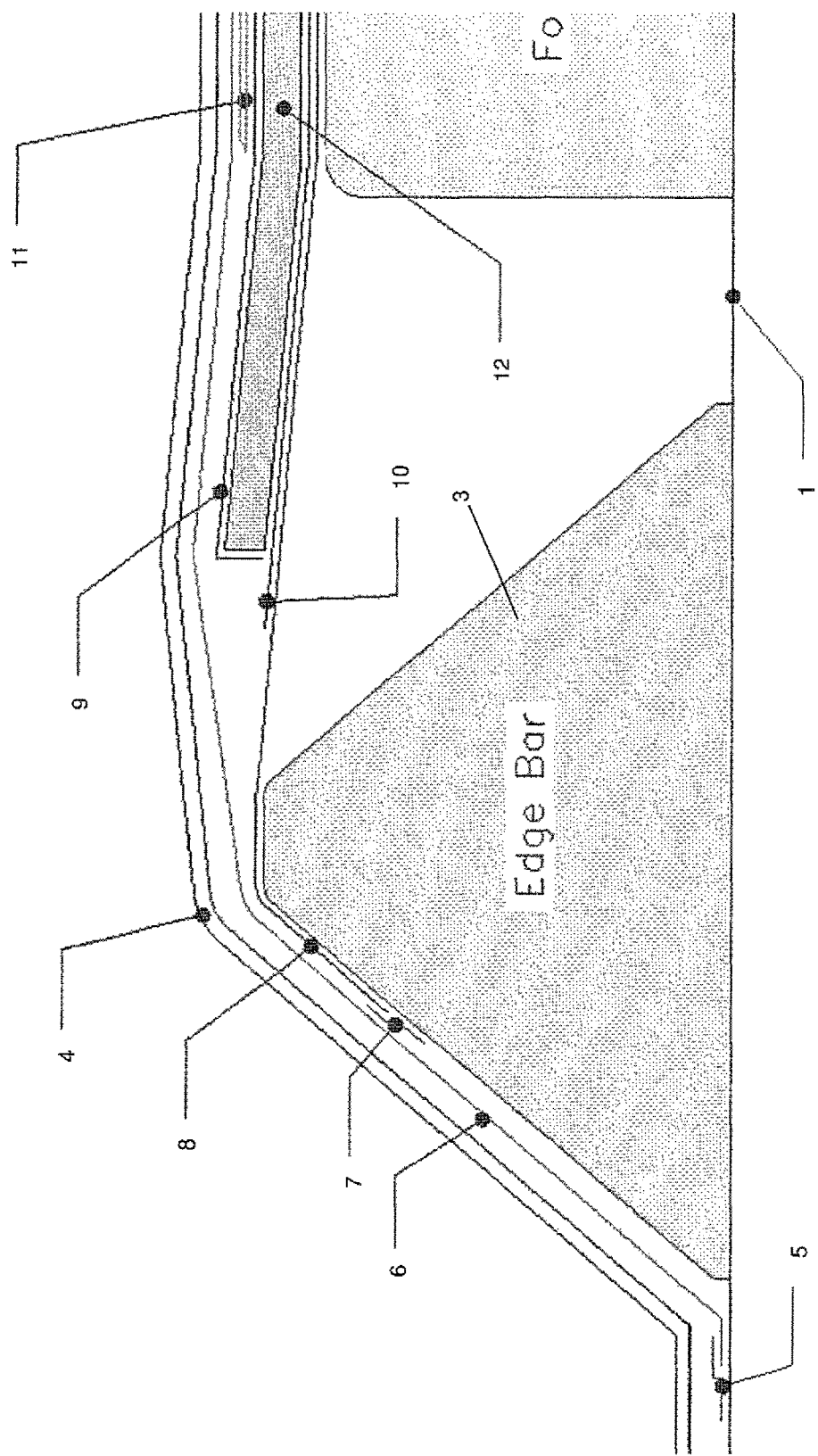
FIG. 3 is an enlarged portion of FIG. 2.

Referring to FIG. 3, a flexible support membrane 8 of Vacfilm 430 is draped over the tool 2 and edge bars 3, and secured to the edge bars 3 by strips of tape 7. Vacfilm 430 is a high stretch elastomeric bagging film available from Aerovac System Ltd (www.aerovac.com). The film has a relatively low tensile modulus of 700 psi (4.8 MPa) at 100% elongation. This is defined as the ratio of tensile stress to tensile strain when the film is subjected to a tensile force in the plane of the film, at 100% elongation.

The charge 12 is encased in two layers 9,10 of fluorinated ethylene propylene (FEP) release film and placed as shown in FIGS. 2 and 3. The charge has a central part 12a which is positioned above the top of the male tool, and side parts 12b, 12c which project on opposite sides of the male tool.

A caul plate 11 is placed on top of the charge and a two-layer diaphragm 4, 6 is draped over the assembly. Note that the caul plate 11 is optional and may be omitted. The first layer of the diaphragm is a layer 6 of WRIGHTLON® WL7400 film which is draped over the assembly and secured to the table 1 by strips of tape 5. WRIGHTLON® WL7400 film is available from Airtech Advanced Materials Group, of Huntington Beach, Calif., USA. The diaphragm layer 6 has a tensile modulus higher than that of the support membrane 8. In addition, the tensile stiffness of the diaphragm layer 6 (which is related to the tensile modulus) in the plane of the diaphragm layer 6 is higher than that of the support membrane 8 in the plane of the support membrane 8. The second layer of the diaphragm is a low-stiffness layer 4 which is draped over the assembly and secured to the table 1 by a robust steel frame. The second diaphragm layer 4 may be formed from a variety of suitable resilient materials. In a preferred embodiment the diaphragm layer 4 is made of Mosite 1453D—a high strength silicone rubber manufactured by the Mosite Rubber Company of Fort Worth, Tex. This has a tensile modulus at 300% elongation of 600 psi (4.1 MPa).

Note that the layer 6 is illustrated as a single ply of material, but alternatively the layer 6 may comprise multiple plies of WL7400 film.

Pressure is applied to the assembly by applying a vacuum via an array of small holes (not shown) in the table 1. The holes are distributed across the whole table so that the whole assembly is evacuated. In other words, the cavity between the support membrane 8 and the table 1 is evacuated, and the cavity between the support membrane 8 and the two-layer diaphragm 4,6 is evacuated, and the cavity between the diaphragm layers 4 and 6 is evacuated.

Figure 4:
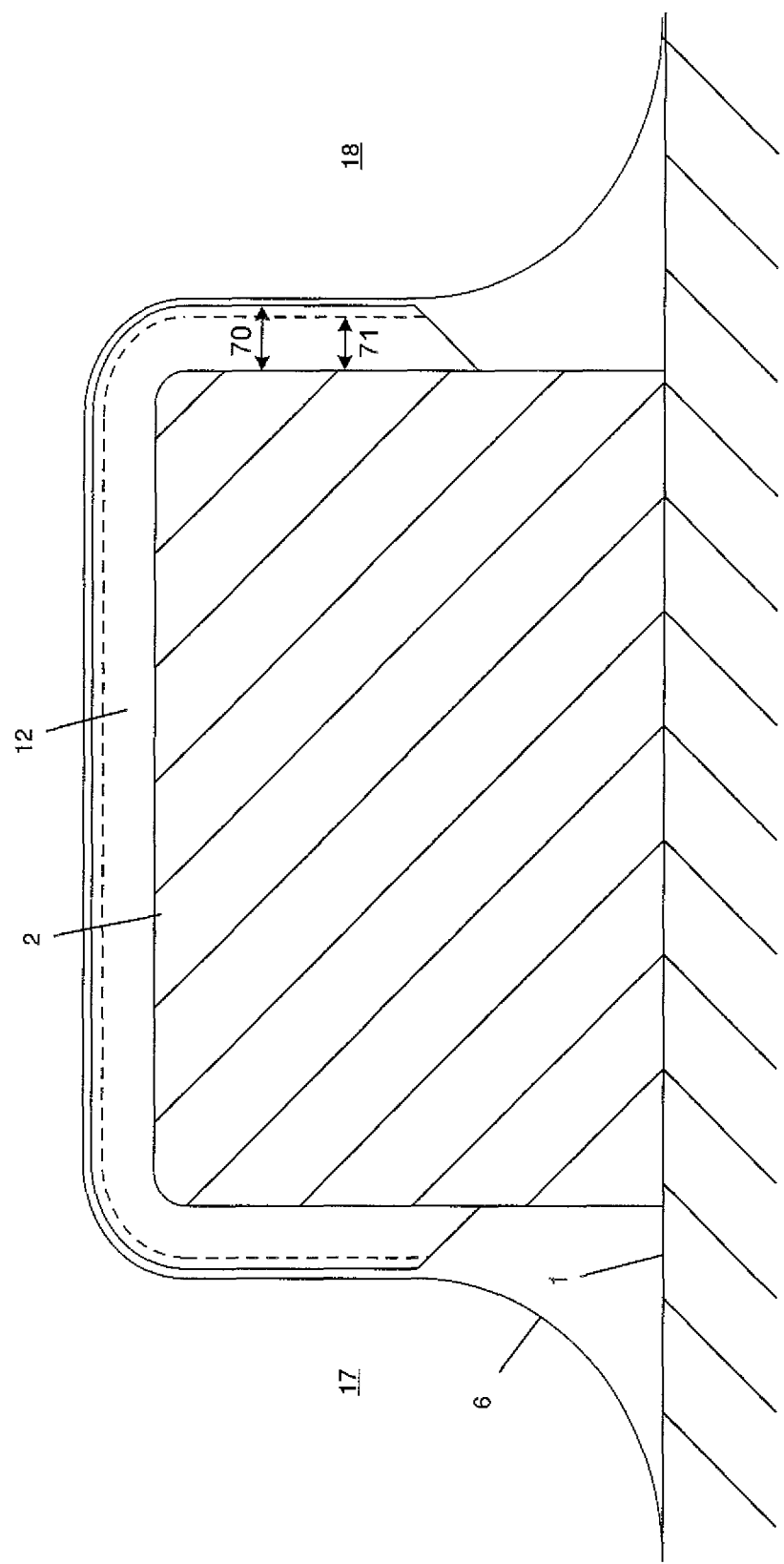
FIG. 4 is a sectional view through the male tool after the charge has been formed.

As shown in FIG. 4, the diaphragm is stretched over the male tool by bridging it over the channels 17,18 between the male tool 12 and the edge bars 3 whereby the pressure difference draws the diaphragm into the channels. As the diaphragm is drawn into the channels 17,18, they progressively deform the sides 12b, 12c of the charge against the sides of the male tool as shown in FIG. 4. Forming may be performed at a high temperature T1 of 85° C.-95° C. (preferably 90° C.), or a lower temperature of 45° C. Note that for purposes of clarity the low-stiffness diaphragm layer 4, release films 9,10, caul plate 11 and film 8 are not shown in FIG. 4.

Heat may be applied by an oven, infrared heating element, or any other means. Optionally, additional debulking pressure may be provided by placing the assembly in an autoclave and applying pressure above 1 bar to the outer side of the diaphragm.

The support membrane 8 supports the weight of the sides 12b, 12c of the charge as it approaches the forming and debulking temperature T1, avoiding a tendency to self form which can result in process wrinkles. The support membrane 8 also ensures that the spar flanges can only form as a catenary, which can otherwise cause process wrinkles.

The stiff diaphragm layer 6 and support membrane 8 place the charge 12 in tension, making it easier to mould it over ramps or other complex shapes on the male tool. Note that the diaphragm layers 4,6 are laid up in tension so as to minimise sag prior to the vacuum being applied.

The pressure difference across the diaphragm imparts a uniform hydrostatic pressure on all areas of the charge 12. The bridging of the diaphragm over the channels between the mould tool and the edge bars 3 causes the diaphragm to stretch, giving a stretching force in the plane of the diaphragm which is reacted by the charge where it engages the convex corners of the male tool. Thus the pressure applied to the charge varies over its surface between a pure hydrostatic pressure (up to atmospheric pressure, or beyond if an autoclave is used) where it engages the less convex approximately planar surface regions on the top and sides of the tool 2, and an intensified pressure at the convex high curvature corners comprising the stretching pressure added to the hydrostatic pressure.

Debulking of the charge is caused by the combination of pressure and increased temperature. Debulking is also assisted by the action of the diaphragm which gradually moves down the sides 12b, 12c of the charge, squeezing excess air out of the charge.

FIG. 4 shows the outer profile of the charge prior to debulk in solid lines, and after debulk in dashed lines. The debulking process reduces the thickness of the charge from a thickness 70 prior to debulk, to a thickness 71 after debulk. Note that the thickness has reduced by a similar amount in both the non-planar and planar regions of the charge. In one embodiment the thickness 70 is about 34 mm and the thickness 71 is about 30 mm After debulking, the deformed charge 12 is transferred to a female curing tool 80 shown in FIG. 5, and relevant consumables applied to the IML of the charge 12. The tool 80 is then placed in an autoclave where it is heated to a curing temperature T2 of approximately 180° C. and pressurised to between 7 and 12 bar to cure the charge.

The charge on the female curing tool 80 is net thickness, which means that the IML surface of the charge does not have to move on cure. Therefore the thickness of the charge remains constant in the non-planar regions where the charge engages the convex corner surfaces 81,82 of the tool 80.

Figure 5:
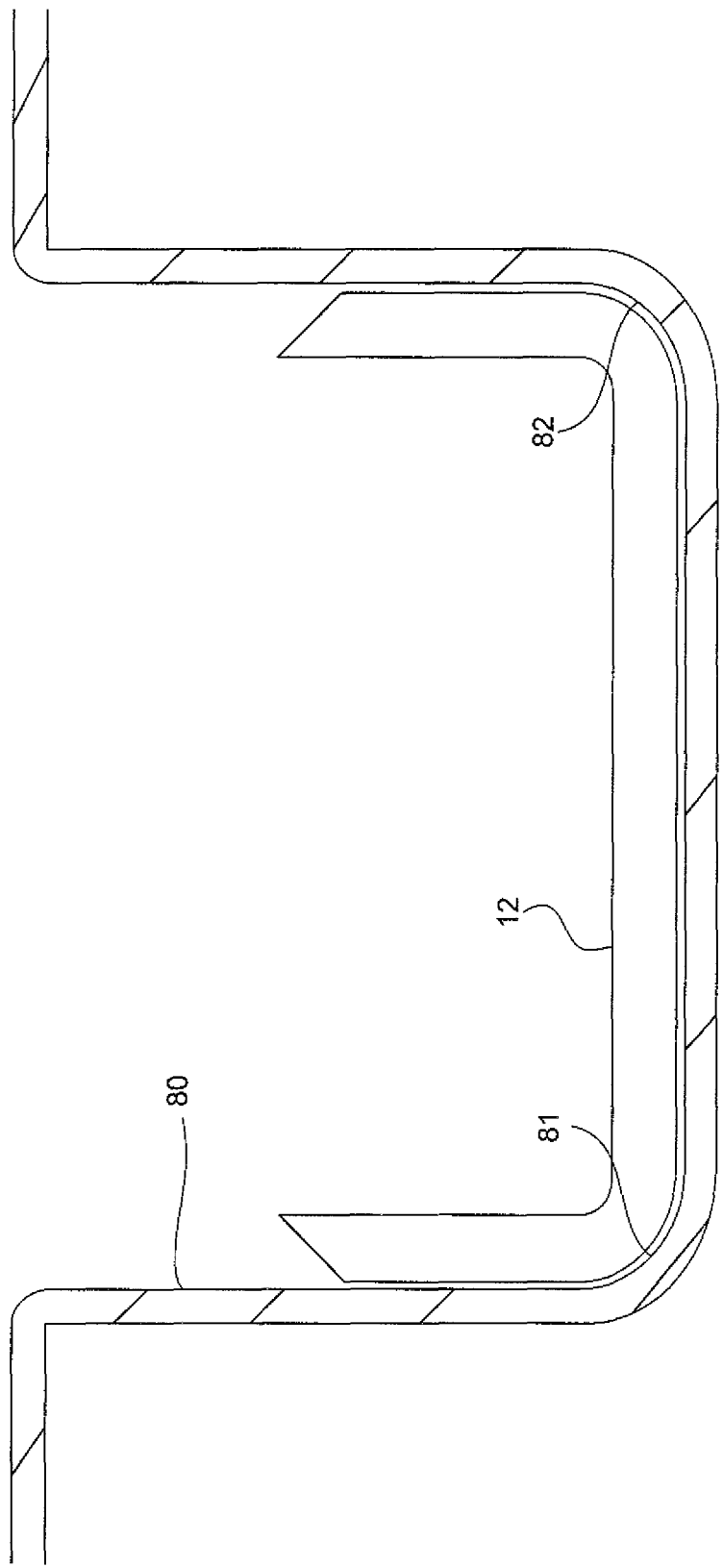
FIG. 5 is a sectional view through a female mould tool.

In an alternative process, instead of curing the charge on a female tool 80 as shown in FIG. 5, the charge may be cured on the male tool 2 which is used for moulding and debulking. In this case, sacrificial plies may be added to the Outer Mould line (OML) of the charge for machining in order to meet geometric tolerances. The hot debulking process controls the thickness of the male cured spar, and thus variability in the part is reduced and the thickness (or number) of sacrificial plies required is minimised.

Figure 6:
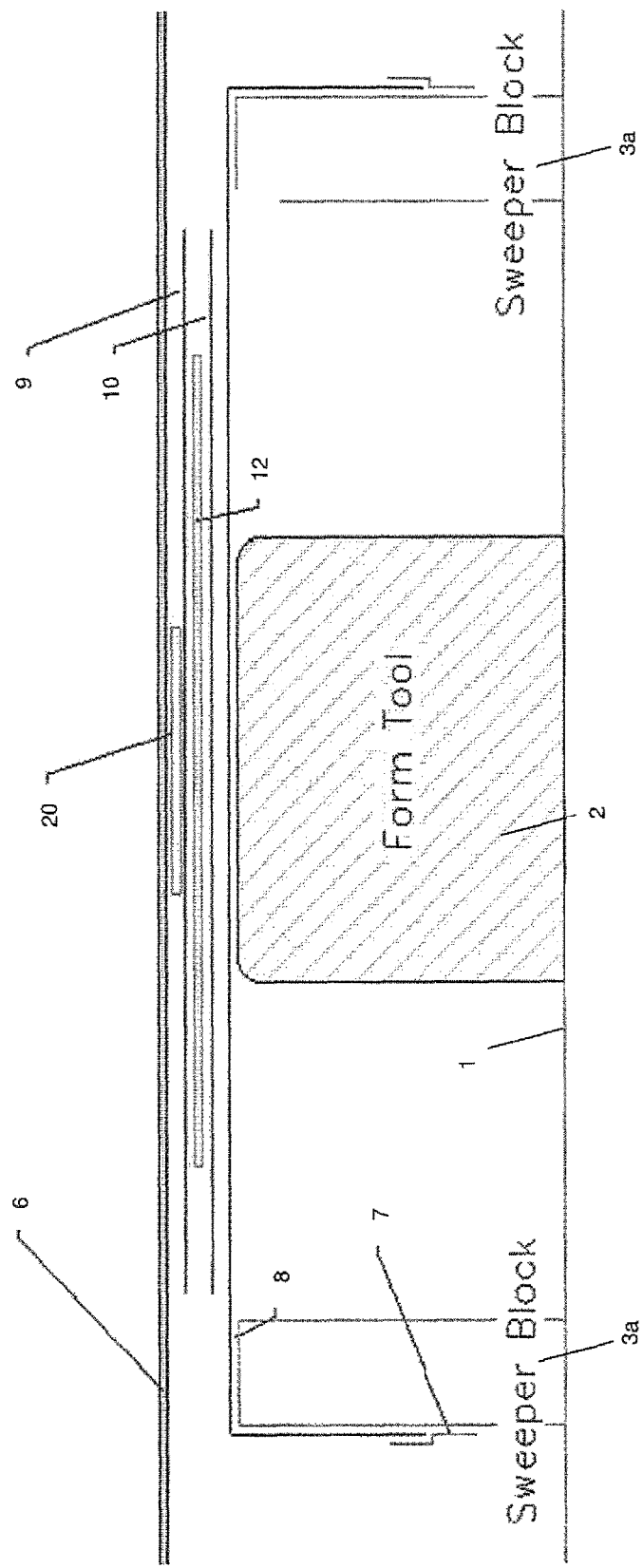
FIG. 6 is a sectional view of an alternative forming assembly.

An alternative forming and debulking assembly is shown in FIG. 6. This is similar to the assembly of FIGS. 1-3 and similar features are given the same reference numeral. Note however that the low-stiffness diaphragm layer 4 and caul plate 11 are omitted, and a breather layer 20 is provided under the stiff diaphragm layer 6. Note also that rectangular sweeper blocks 3a are provided instead of the triangular edge bars 3 shown in FIGS. 1-3.

Figure 7:
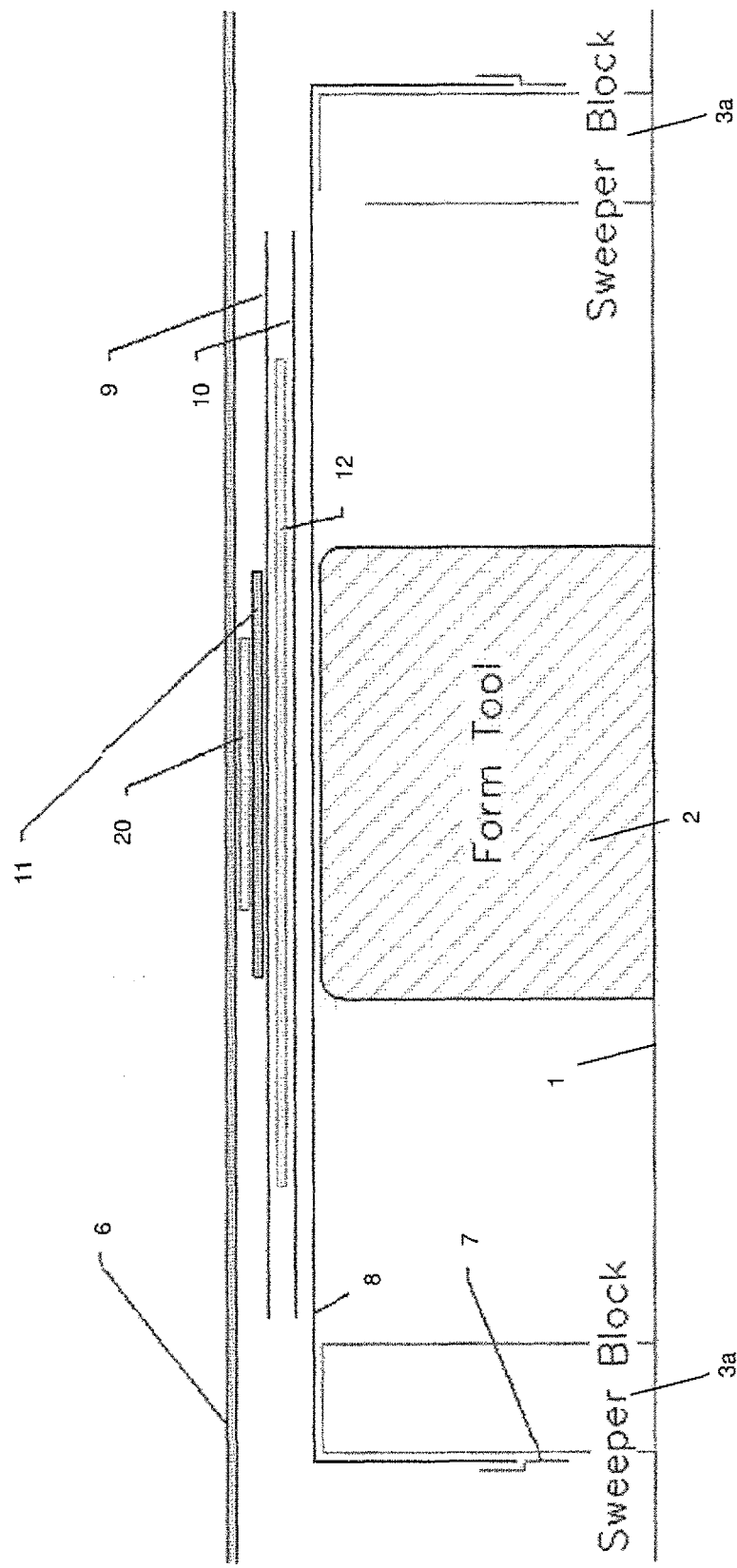
FIG. 7 is a sectional view of a further alternative forming assembly.

A further alternative forming and debulking assembly is shown in FIG. 7. This is similar to the assembly of FIG. 6 and similar features are given the same reference numeral. Note that in contrast with FIG. 7 a caul plate 11 is included.

Referring to FIG. 1, the tool 2 has a curved edge 13 with a large radius of curvature (of the order of 100 meters). Each layer of prepreg contains an array of carbon fibres which extend in one direction. Some of the prepregs are laid with their fibres extending in a spanwise direction between the root 15 and tip 16 of the spar. These are conventionally referred to as "zero fibres" since they are aligned at 0° to the spanwise direction. Others are laid with their fibres extending in a chordwise direction at right angles to the spanwise direction. Others are laid at an angle of +/−45 degrees to the spanwise direction. In a conventional assembly a wrinkle tends to form along a line 14 shown in FIG. 1. It is believed that this forms due to the zero fibres.

Surprisingly, it has been found that by using a diaphragm layer 6 which is relatively stiff, this wrinkle tends not to form. Also, experiments have been conducted with diaphragms 6 of varying stiffness, and it has been found that the greater the stiffness the greater the pressure which is applied at the convex corners of the male tool 2. Concentration of forces at the convex corners is desirable for both forming and debulking.

The low stiffness diaphragm layer 4 is resilient to repeated cycling, so can be re-used for a number of forming cycles. In contrast the high stiffness diaphragm layer 6, whilst achieving better laminate consolidation, may need to be replaced more frequently.

Although the invention has been described above with reference to one or more preferred embodiments, it will be appreciated that various changes or modifications may be made without departing from the scope of the invention as defined in the appended claims.

The invention claimed is:

1. A method of moulding a charge during the manufacture of a composite part, the method comprising:
    placing the charge, a support membrane, and a diaphragm on a male tool having at least one convex corner between a top of said mold and at least one side of said mold, the support membrane and diaphragm being positioned on opposite sides of the charge, the charge having a first part which is positioned above said top of the male tool and a second part which projects to said at least one side of the male tool;
    supporting the weight of the second part of the charge with the support membrane;
    placing the diaphragm in tension, wherein the diaphragm is under tension while the support membrane supports the weight of the second part of the charge and before a vacuum is applied;
    applying the vacuum between the support membrane and the diaphragm;
    stretching the diaphragm over the top of the male tool as the vacuum is applied, and
    progressively deforming the support membrane and the second part of the charge against said at least one side of the male tool by applying a pressure difference across the diaphragm and stretching the diaphragm over the male tool as the pressure difference is applied, wherein the diaphragm has a stiffness in the plane of the diaphragm which is higher than the stiffness of the support membrane in the plane of the support membrane.

2. The method of claim 1 wherein the charge comprises a stack of plies of composite material.

3. The method of claim 2 wherein each ply contains a set of fibres which are substantially aligned with each other.

4. The method of claim 1 wherein the diaphragm is stretched over the male tool by bridging it over a channel next to the male tool whereby the pressure difference draws the diaphragm into the channel.

5. The method of claim 1 further comprising removing the deformed charge from the male tool; and curing it on a female tool.

6. The method of claim 1 wherein the top of the male tool meets the side of the male tool at said convex corner, said corner having a relatively high curvature.

7. The method of claim 1 wherein the diaphragm has a tensile modulus in the plane of the diaphragm which is greater than 6 MPa.

8. The method of claim 1 wherein the diaphragm has a tensile modulus in the plane of the diaphragm which is greater than 7 MPa.

9. The method of claim 1 wherein the diaphragm has a tensile modulus in the plane of the diaphragm which is greater than 8 MPa.

10. The method of claim 1 wherein the diaphragm is a multi-layer diaphragm.

11. A composite part manufactured by the method of claim 1.

12. The composite part of claim 11, wherein the composite part is an aircraft part.

13. The method of claim 1 wherein the diaphragm comprises two diaphragm layers, and the two diaphragm layers are each laid up in tension prior to the vacuum being applied.

14. The method of claim 1 wherein the diaphragm comprises a first diaphragm layer and a second diaphragm layer, and the first diaphragm layer and the second diaphragm layer have different stiffnesses.

15. The method of claim 14 wherein the second diaphragm layer is laid up on top of the first diaphragm layer, and the stiffness of the first diaphragm layer is greater than the stiffness of the second diaphragm layer.

16. The method of claim 1 further comprising placing a caul plate between the charge and the diaphragm.

17. The method of claim 1 wherein the male tool is mounted on a table; applying the pressure difference across the diaphragm comprises applying a vacuum between the support membrane and the table; the diaphragm is laid up in tension prior to the vacuum between the support membrane and the diaphragm being applied; and the diaphragm is laid up in tension prior to the vacuum between the support membrane and the table being applied.

18. The method of claim 1 further comprising placing the diaphragm over edge bars arranged on opposite sides of the male tool prior to the application of the vacuum, wherein the diaphragm is stretched due to the diaphragm bridging between the edge bars.

19. The method of claim 1 wherein the stretching of the diaphragm occurs at least partially prior to the application of the vacuum.

20. The method of claim 19 wherein the stretching of the diaphragm prior to the application of the vacuum is caused by the diaphragm bridging over the male tool by being supported on support structures on opposite sides of the male tool.

* * * * *